US005702521A

United States Patent [19]

Suchanec

[11] Patent Number: 5,702,521
[45] Date of Patent: Dec. 30, 1997

[54] AIR-ENTRAINED CONCRETE WITH LIGNIN-CONTAINING AIR-ENTRAINING AGENT

[75] Inventor: Richard Robert Suchanec, Newark, Del.

[73] Assignee: Hercules Incorporated, Wilmington, Del.

[21] Appl. No.: 728,026

[22] Filed: Oct. 9, 1996

Related U.S. Application Data

[62] Division of Ser. No. 483,620, Jun. 7, 1995, abandoned.

[51] Int. Cl.$^6$ ............................. C08B 7/00; C08B 9/12; C08B 28/00; C08B 28/04
[52] U.S. Cl. ..................... 106/713; 106/719; 106/724; 524/2; 524/72; 524/270
[58] Field of Search ......................... 106/713, 719, 106/720, 724; 524/2, 72, 270

[56] References Cited

U.S. PATENT DOCUMENTS

| | | | |
|---|---|---|---|
| 2,221,540 | 11/1940 | Hall . | |
| 3,854,969 | 12/1974 | Zwahlen | 106/176 |
| 4,100,016 | 7/1978 | Diebold et al. | 162/15 |
| 4,325,736 | 4/1982 | Okada et al. | 106/88 |
| 4,764,596 | 8/1988 | Lora et al. | 530/507 |
| 5,192,361 | 3/1993 | Schilling . | |
| 5,196,460 | 3/1993 | Lora et al. | 524/76 |
| 5,254,639 | 10/1993 | Gardziella et al. | 525/398 |
| 5,275,652 | 1/1994 | Dåstøl | 106/482 |
| 5,522,927 | 6/1996 | Hegge | 106/659 |

OTHER PUBLICATIONS

E. K. Pye et al., Tappi Journal, Mar. 1991, "The Alcell™ Process, A Proven Alternative to Kraft Pulping", pp. 113–118 Date Missing.

G. A. Smook, "Handbook For Pulp and Paper Technologists, 2nd Edition", Angus Wilde Publications, pp. 65–83, 1992.

Hercules Chemical Specialties Product Data, "Vinsol® Resin", Apr. 18, 1995.

Hercules Chemical Specialties Product Data, "Vinsol® NVX", Sep. 19, 1994.

Hercules Chemical Specialties Technical Information, "Poly–Pale® Resin", Oct. 10, 1994.

Hercules Chemical Specialties Technical Information, "Dymerex® Resin", Jun. 28, 1994.

Hercules Technical Information, "Vinsol® Resin Air Entraining Agent For Cement Products", Dec. 1988.

Hercules Technical Information, "Vinsol® Resin, Use In Asphalt Emulsions", Nov. 1991.

*Primary Examiner*—Nathan M. Nutter
*Attorney, Agent, or Firm*—Martin F. Sloan

[57] ABSTRACT

Resinous compositions comprising lignin and polymerized rosin. Use of salts of the resinous compositions as concrete air-entraining agents and asphalt emulsifiers.

18 Claims, No Drawings

AIR-ENTRAINED CONCRETE WITH LIGNIN-CONTAINING AIR-ENTRAINING AGENT

This application is a division, of application Ser. No. 08/483,620, filed Jun. 7, 1995 and now abandoned.

FIELD OF THE INVENTION

This invention relates to resinous compositions comprising lignin and polymerized rosin. It also pertains to the use of the resinous compositions as air-entraining agents for concrete and as asphalt emulsifiers.

BACKGROUND OF THE INVENTION

In the manufacture of pale wood rosin from southern pine stumpwood, crude rosin is extracted from the wood and then refined using solvent/solvent partitioning between aliphatic hydrocarbon and polar solvents. One of the by-products of this operation is a dark, high melting, largely aliphatic hydrocarbon-insoluble resin, hereinafter referred to as AHI resin.

AHI resin, available as Vinsole® resin from Hercules Incorporated, Wilmington, Del., is used in a wide variety of industrial applications including asphalt emulsions and concrete air-entrainment. Because the amount of wood rosin produced relative to tall oil and gum rosin is declining, the supply of AHI resin available for industrial applications is also declining.

Consequently, there is a need for a material which will perform in asphalt emulsions and concrete air-entrainment in a manner similar to that of AHI resin.

SUMMARY OF THE INVENTION

This invention pertains to a resinous composition comprising lignin and polymerized rosin, wherein the polymerized rosin comprises a mixture of rosin acid dimer and monomeric rosin acids. In a preferred embodiment, the composition also contains added rosin acids and AHI resin, and the lignin is an organosolv lignin.

In another aspect, the invention pertains to a method for preparing a resinous composition comprising: a) combining and melting ingredients comprising lignin and polymerized rosin to obtain a molten blend; b) stirring the molten blend until it is substantially homogeneous; and c) cooling the substantially homogeneous molten blend until it solidifies. In a preferred embodiment of this aspect of the invention, the ingredients further comprise added rosin acids and AHI resin, and the lignin is organosolv lignin.

In yet another aspect, the invention pertains to a method for preparing an alkali metal or ammonium salt of a resinous composition comprising dissolving ingredients comprising polymerized rosin and alkali metal or ammonium hydroxide in water to form an aqueous solution comprising a salt of polymerized rosin, and dissolving lignin in the aqueous solution. In a preferred embodiment of this aspect of the invention, the method further comprises adding AHI resin to the aqueous solution comprising the salt of polymerized rosin, and the ingredients further comprise added rosin acids.

In still other aspects the invention pertains to air-entrained concrete containing an air-entraining agent comprising a blend of an alkali metal salt of lignin and an alkali metal salt of polymerized rosin, and to asphalt emulsions containing an emulsifier comprising a blend of an alkali metal salt of lignin and an alkali metal salt of polymerized rosin.

DETAILED DESCRIPTION OF INVENTION

Lignin is a generic name for an amorphous, highly polymerized material which forms the middle lamella of most plant fibers (especially woods) and cements the fibers together by means of an intercellular layer surrounding them. The primary commercial source of lignin is wood, in particular the wood used to manufacture paper.

In the manufacture of cellulose pulp for paper and other uses, wood is treated by a number of different processes to separate the cellulose fiber from lignin and other by-products. The most common pulping processes are the kraft and sulfite processes, and they produce by-product lignin conventionally known as kraft lignin and sulfite lignin respectively. Descriptions of these processes can be found in "Handbook For Pulp & Paper Technologists, 2nd Edition" by G. A. Smook, Angus Wilde Publications, 1992, pages 65–83, which is incorporated herein by reference. An organosolv process is described by Diebold et al. in U.S. Pat. No. 4,100,016, by Lora et al. in U.S. Pat. No. 4,764,596 and by Pye et al. in TAPPI Journal, March, 1991, pages 113–118, all of three of which are incorporated herein by reference in their entirety. The lignin produced by the processes described in these references is conventionally known as organosolv lignin.

Lignins produced by any of the conventional pulping processes, in particular kraft, sulfite and organosolv processes, are useful in the instant invention. The preferred lignin is organosolv lignin, and the most preferred is organosolv lignin known as ALCELL™ lignin powder, manufactured by Repap Technologies Inc., Valley Forge, Pa.

Polymerized rosin useful in this invention is manufactured by acid catalyzed polymerization of rosin. It comprises predominantly dimeric rosin acids and is generally available as a mixture of dimerized and monomeric rosin acids. Commercially available polymerized rosin comprises a mixture of about 30 to about 90 wt. percent rosin dimer and about 10 to about 70 wt. percent rosin acids. The preferred polymerized rosin for this invention comprises a mixture of from about 30 to about 50 wt. percent dimerized rosin. The most preferred polymerized rosin is Poly-Pale® resin available from Hercules Incorporated, Wilmington, Del.

Rosin acids may be added as another useful ingredient in the practice of this invention. The source and identity of the added rosin acids is not critical. They may be added as rosin, hydrogenated rosin, disproportionated rosin or as a volatile portion of polymerized rosin obtained by stripping off volatile monomeric rosin acids from polymerized rosin, preferably Poly-Pale® resin, through vacuum distillation. Useful rosin acids may also be individual component rosin acids found in rosin, hydrogenated rosin, disproportionated rosin or a volatile portion of polymerized rosin obtained by stripping off volatile monomeric rosin acids from polymerized rosin, preferably Poly-Pale® resin, through vacuum distillation (pressure, about 3–7 mm of mercury, temperature, about 280°–285 C.). A preferred source of added rosin acids is a volatile portion of polymerized rosin obtained by stripping off the volatile monomeric rosin acids from polymerized rosin, preferably Poly-Pale® resin, through vacuum distillation (pressure, about 3–7 mm of mercury, temperature, about 280°–285° C.). A major component of these volatile monomeric rosin acids is dehydroabietic acid, present at a level of about 60–70% by weight.

Yet another useful ingredient in the compositions of this invention is a dark, relatively high melting, largely aliphatic hydrocarbon-insoluble resin, hereinafter referred to as AHI resin, which is a by-product of the solvent/solvent refining of pale wood rosin extracted from southern pine stumpwood. This material is a thermoplastic resin that chemically is a complex mixture of high molecular weight phenolic compounds, rosin acids, neutral materials and several minor components. An AHI resin is produced as described in U.S. Pat. No. 2,221,540, which patent is incorporated herein by reference in its entirety. A preferred AHI resin is Vinsol® resin available from Hercules Incorporated, Wilmington, Del.

In compositions of this invention, the ratio of lignin to polymerized rosin on a weight basis is from about 0.8 to about 2.3. Preferably the ratio is from about 1 to about 2, and more preferably from about 1.5 to about 2.

The ratio of added rosin acids to the total of lignin and polymerized rosin on a weight basis is preferably no greater than about 0.25. More preferably the ratio is from about 0.05 to about 0.2, and most preferably from about 0.05 to about 0.15.

The ratio of AHI resin to the total of lignin and polymerized rosin on a weight basis is preferably no greater than about 0.45. More preferably the ratio is no greater than about 0.25, and most preferably no greater than about 0.05.

The compositions of this invention are in free acid form, in the form of a salt of an alkali metal or ammonium, or as mixtures of both. The alkali metal is selected from the group consisting of lithium, sodium and potassium. The preferred alkali metal is sodium. In the free acid form, properties of the compositions which are usually measured are the acid number, the weight percent soluble in aliphatic hydrocarbon, conventionally known as percent gasoline soluble, and the Ring and Ball softening point. In the free acid form, the acid number of the resinous compositions of this invention is from about 80 to about 110, the percent gasoline soluble is from about 10 to about 40, and the Ring and Ball softening point is from about 120° C. to about 160° C. Preferably, the acid number is from about 80 to about 105, the percent gasoline soluble is from about 15 to about 35, and the softening point is from about 130° C. to about 150° C.

A method for preparing the resinous compositions of this invention comprises: (a) combining and melting ingredients comprising lignin and polymerized rosin to obtain a molten blend; (b) stirring the molten blend until it is substantially homogeneous; and (c) cooling the substantially homogeneous molten blend until it solidifies. When additional ingredients such as added rosin acids and AHI resin are utilized, they are added to the resinous composition of this invention, either before or after the lignin and polymerized rosin are melted in step (a) above.

a preferred method for preparing the resinous compositions of this invention comprises: (a) heating polymerized rosin until it melts; (b) adding lignin to the melted polymerized rosin; (c) stirring the mixture of lignin and polymerized rosin until it is substantially homogeneous; and (d) then cooling the substantially homogeneous melt blend until it solidifies. When additional ingredients such as added rosin acids and AHI resin are utilized, they are added in step (a), either before or after the polymerized rosin has been melted, or in step (b).

The blending temperature is above the melting temperature of the polymerized rosin, generally above 150° C., and is preferably in the range of from about 150° C. to about 175° C. The most preferable blending temperature is from about 155° C. to about 175° C.

For some uses, e.g. when the resinous composition of this invention is later to be dissolved in alkali, it is sufficient to blend and mix the polymerized rosin and lignin, as well as any additional ingredients, in the form of lumps, flakes or powders, rather than melting the ingredients. If this procedure is practiced, it is preferred that the individual ingredients be in the form of small flakes or powder to ensure adequate mixing. Thorough mixing can be attained by grinding the mixture of solid ingredients.

The compositions of this invention may also be prepared in the form of a salt of an alkali metal or ammonium. The alkali metal is selected from the group consisting of lithium, sodium and potassium. Most preferably the salt is a sodium salt.

The preferred method for preparing the salt comprises dissolving ingredients comprising polymerized rosin and alkali metal or ammonium hydroxide in water to form an aqueous solution comprising a salt of polymerized rosin, and dissolving lignin in the aqueous solution. The ingredients added to the aqueous solution may further comprise added rosin acids and AHI resin. For some applications the salt will be useful in the form of the aqueous solution. However, if desired, the water can be removed from the aqueous solution to form a solid, substantially dry salt. A preferred method of water removal is distillation.

The alkali metal or ammonium salts can also be prepared by solution of the blended composition in aqueous alkali metal or ammonium hydroxide.

In free acid form, the resinous compositions of this invention may also be converted to and utilized in the form of aqueous dispersions. Such dispersions are readily prepared using resinous composition, water, ammonia and acid coagulated casein in the approximate weight ratios of 100/160/2.5/2 respectively.

In another embodiment, this invention relates to air-entrained concrete containing an air-entraining agent comprising a blend of an alkali metal salt of lignin and an alkali metal salt of polymerized rosin. The air-entraining agent may further comprise alkali metal salts of AHI resin and added rosin acids.

Air-entraining agents are used to improve the ability of concrete to resist damage from freezing. They produce a foam which persists in the mixed concrete and serves to entrain many small spherical air voids that measure from 10 to 250 µm in diameter. The air voids alleviate internal stresses in the concrete that may occur when water trapped in the concrete freezes. In practice, up to 10% air by volume may be entrained in concrete placed in severe environments.

When alkali metal salts of this invention are utilized as air-entraining agents for concrete, they are generally used at a level of from about 0.004 to about 0.02 weight percent based on the weight of the dry cement in the concrete mix.

In yet another embodiment this invention relates to asphalt emulsion containing an emulsifier comprising a blend of an alkali metal salt of lignin and an alkali metal salt of polymerized rosin. The emulsifier may further comprise alkali metal salts of AHI resin and added rosin acids.

Asphalt emulsions are used in a variety of applications such as road building, road sealing, soil stabilization, mulching, surface coating of asphalt pavements, and built-up roofs.

When alkali metal salts of this invention are utilized as asphalt emulsifiers, they are generally used at a level of from about 1 to about 2 weight percent based on the total weight of the emulsion.

In addition to their use in air-entrainment and asphalt emulsification, the compositions of this invention are useful ingredients in the wide variety of applications now served by AHI resin. These uses include adhesives, electric insulation, floor coverings, foundry molds, inks and phenolic resins.

The invention is illustrated by the following Examples, which are provided for the purpose of representation, and are not to be construed as limiting the scope of the invention. All parts and percentages in the examples are by weight unless otherwise specified.

Materials and Procedures

Organosolv lignin: ALCELL™ Lignin Powder obtained from Repap Technologies, Valley Forge, Pa.: acid number 20–25, glass transition temperature 90°–100° C., Ring and Ball softening point 145° C., measured by ASTM method E-28(1992).

Polymerized rosin: Poly-Pale® resin, obtained from Hercules incorporated, Wilmington, Del. Poly-Pale® resin contains approximately 40 wt. % rosin acid dimer and 60 wt. % monomeric rosin acids.

Added rosin acids: Obtained by vacuum stripping of Poly-Pale® resin available from Hercules Incorporated, Wilmington, Del. The conditions for the vacuum distillation were: pressure, 3–7 mm of mercury; temperature 280°–285° C. The distillate, which was utilized as added rosin acids, contained 60–70% dehydroabietic acid.

AHI resin: Vinsol® resin obtained from Hercules Incorporated, Wilmington, Del., acid number 90–105, Ring & Ball softening point 103°–123° C.

Ring and Ball softening points were determined by ASTM method E-28(1992).

Percent gasoline solubles was determined by the following procedure. The solvent was Amsco Special Extraction Naphtha available from American Mineral Spirits Co., Chicago, Ill. Fifty grams of sample to be analyzed was weighed into a 750 ml Erlenmeyer flask, covered with 100 ml of solvent and then refluxed under a condenser for 30 minutes. The solvent was then decanted into a 1000 ml separatory funnel containing 100 to 150 ml of water. Then 100 ml of fresh solvent was added to the sample in the flask, refluxed for 30 minutes. Again the solvent was decanted into the separatory funnel. This was repeated for two more washings. The combined decanted solution was then washed in a separatory funnel with water. The last water was drained carefully from the bottom of the separatory funnel, and the clear solution was decanted into a 1000 ml Erlenmeyer flask. It was concentrated by evaporation to the point where it could be transferred to a tared 250 ml beaker. The remainder of the solvent was evaporated on a hot plate until the residue reached a friable condition and then weighed.

EXAMPLES 1–4

These examples describe preparation of the free acid form of the resinous compositions.

Lignin was added to a premelted, stirred mixture of polymerized rosin and added rosin acids in an externally heated vessel maintained at either 150° C. or 170° C. The mixture was stirred for 3–4 hours at temperature and then cooled to ambient temperature. After cooling, the resinous material was easily pulverized to a fine, 30–40 mesh brown powder. The properties of the products are in Table 1. Comparative Example 4, which lists the properties of AHI resin, is included for comparison.

EXAMPLES 5–6

These examples illustrate production of the sodium salt of the resinous compositions of this invention.

The general procedure followed was to make a solution of sodium hydroxide in water (1 g NaOH/37.5 ml water). The polymerized rosin and added rosin acids were added to the NaOH solution, and then the temperature was then raised to 100° C., and the mixture was stirred for about 1 hour, or until the polymerized rosin and added rosin acids were completely dissolved. The reactor contents were then cooled to ~80° C. and the lignin and AHI resin (if utilized) were added. The resulting mixture was stirred for about 15 minutes, and then the temperature was gradually raised to about 135° C. while the water was allowed to distill from the reactor. About half of the water was removed in this way. The resin was then transferred to stainless steel trays, which were place in a vacuum oven at ~100° C. to drive off the remainder of the water. After drying, the resin was ground to a fine, dark-brown powder. The products prepared are summarized in Table 2.

TABLE 1

|  | Exp. 1 | Exp. 2 | Exp. 3 | Exp. 4 |
|---|---|---|---|---|
| Blending Temp., °C. | 150 | 170 | 170 | — |
| COMPONENT | Wt. % | Wt. % | Wt. % | Wt. % |
| Polymerized rosin[1] | 30 | 30 | 28.5 | — |
| Added rosin acids[2] | 15 | 15 | 14.25 | — |
| Organosolv lignin[3] | 55 | 55 | 52.25 | — |
| AHI resin[4] | — | — | 5 | 100 |
| PROPERTY |  |  |  |  |
| Acid number | 102 | 96 | 95 | 103 |
| % Gasoline Soluble | 32 | 31 | 31 | 28 |
| Ring & Ball softening point, °C. | 135 | 129 | 135 | 104 |

[1]Poly-Pale ® resin - Hercules Incorporated
[2]Obtained by vacuum stripping of Poly-Pale ® resin.
Conditions: pressure, 3–7 mm of mercury temperature, 280°–285° C.
[3]ALCELL ® lignin - Repap Technologies Inc.
[4]Vinsol ® resin - Hercules Incorporated

TABLE 2

| COMPONENT | Example 5 Wt. % | Example 6 Wt. % |
|---|---|---|
| Polymerized rosin[1] | 6.8 | 6.8 |
| Added rosin acids[2] | 2.3 | 2.3 |
| Organosolv lignin[3] | 13.6 | 13.6 |
| AHI resin[4] | 0.2 | — |
| Sodium hydroxide | 2 | 2 |
| Water | 75 | 75.2 |

[1]Poly-Pale ® resin - Hercules Incorporated
[2]Obtained by vacuum stripping of Poly-Pale ® resin.
Conditions: pressure, 3–7 mm of mercury temperature, 280°–285° C.
[3]ALCELL ® lignin - Repap Technologies Inc.
[4]Vinsol ® resin - Hercules Incorporated

EXAMPLES 7–10

These examples illustrate the evaluation of the resin compositions of this invention as air-entraining agents for concrete.

Cement used for testing was Type I/II Portland Cement produced by RMC, Davenport, Calif. and supplied by Quickcrete of Northern California. Aggregates used were supplied by Central Concrete, San Jose, Calif. Coarse aggregate was 1"×No.4 limestone from Kaiser Permanente, Cupertino, Calif. Fine aggregate used was Olympia "O" sand from Felton, Cailf. The material proportions used for the test concrete are as follows:

| Material | Weight % |
| --- | --- |
| Cement (dry) | 11.8 |
| Coarse aggregate | 43.8 |
| Fine aggregate | 36.9 |
| Water | 7.5 |

The air-entraining agents to be tested were made up to 12% solutions in water. The amount added to test concrete was at the level of 29.57 ml of 12% solution per 42.64 kg of cement. The trial batches were prepared following the procedures of ASTM Test Method C192(1990). The amount of entrained air in the freshly mixed concrete was measured using the gravimetric method, ASTM Test C138(1992). Results for the amount of entrained air are present in Table 3. Each composition was prepared and tested several times. The results of each test are listed in the Table as a Run number along with the average value. Examples 7 and 8 in Table 3 are comparative examples. Comparative Example 7 contains no air-entraining agent; Comparative Example 8 utilizes a sodium salt of AHI resin available as Vinsol® NVX soap, the sodium soap of Vinsol®, from Hercules Incorporated, Wilmington, Del. Vinsol® NVX soap is widely used commercially as an air-entraining agent.

The data in Table 3 demonstrate that the compositions of this invention entrain more air in concrete than does the commercial entraining agent Vinsol® NVX soap.

ture ranged from 43°–49° C. The emulsion output temperature ranged from 84° C. to 89° C.

Testing of the emulsions and of the dried emulsion residues was carried out by the following tests:

COMPOSITION TESTS
  ASTM D244 (1993): Residue by Evaporation
    Measures percent residual asphalt solids in emulsion
  ASTM D244 (1993): Particle Charge
    Identifies cationic and anionic emulsions
CONSISTENCY TESTS
  ASTM D244 (1993): Viscosity at 25° C.
    Emulsion viscosity reported as SFS(Saybolt Furol Seconds) at the specified temperature
STABILITY TESTS
  ASTM D244 (1993): Settlement
    Measures settlement of emulsified asphalt on 1 day and 5 day storage
  ASTM D244 (1993): Cement Mixing
    Measures the chemical stability, percent break, between emulsifier and asphalt, e.g. the stability of the emulsion when it mixes with and coats mineral aggregate
  ASTM D244 (1993): Sieve Test
    Measures amount of coalesced asphaltic material that is present in emulsion
EXAMINATION OF RESIDUE
  ASTM D5 (1993): Penetration
    Determination of the penetration of semi-solid and solid bituminous materials. Measures hardness of the asphalt

TABLE 3

| | % Entrained Air | | | | | | | |
| --- | --- | --- | --- | --- | --- | --- | --- | --- |
| | Run 1 | Run 2 | Run 3 | Run 4 | Run 5 | Run 6 | Run 7 | Ave. |
| Comparative Example 7 no additive | 1.38 | 1.85 | 2.36 | 2.13 | 0.81 | 1.08 | — | 1.60 |
| Comparative Example 8 Vinsol® NVX soap | 5.66 | 4.76 | 5.99 | 5.74 | 5.58 | 7.85 | 4.46 | 5.72 |
| Example 9 Table 2, Exp 5 | 7.77 | 8.94 | 6.10 | 8.12 | 7.50 | — | — | 7.69 |
| Example 10 Table 2, Exp 6 | 8.48 | 7.80 | — | — | — | — | — | 8.14 |

EXAMPLES 11–13

These examples demonstrate the performance of the compositions of this invention as emulsifiers for asphalt.

The sodium soaps described in Table 2 were tested at levels of 1.25, 1.5 and 1.75 wt. % based on the total weight of the emulsion. A sodium salt of AHI resin available as Vinsol® NVX soap, the sodium soap of Vinsol®, from Hercules Incorporated, Wilmington, Del., was utilized as a control. Vinsol® NVX soap is widely used commercially as an asphalt emulsifier.

The composition to be tested as an emulsifier was put in water at 49°–60° C. and then the temperature was raised to about 82° C. with stirring to ensure complete solution. The resulting solution, hereinafter referred to as soap solution, was transferred to a soap tank attached to a Charlotte G-5, 5405 rpm colloid mill. Tolerance for this Charlotte mill is fixed at 0.69 mm. The asphalt used was EBS (Emulsion Base Stock) X-Hard from Shell Oil Co. During milling, the temperature of the emulsion ranged from 138° C. to 143° C. at 61% residual asphalt solids. The soap solution tempera- ASTM D113 (1993): Ductility Measured by elongation before break of a briquette specimen pulled apart at specified speed and temperature.

ASTM D36 (1989): Softening Point, Ring & Ball Method

Determination of softening point of bitumen in the range from 30° C. to 157° C.

Results for the emulsion tests are presented in Tables 4, 5 and 6.

The data indicate that at the 1.75% emulsifier level the control, Vinsol® NVX sodium soap, and soap produced in Example 5, produce emulsions that meets all ASTM specifications. Emulsions based on the soap produced in Example 6 meets all ASTM specifications at the 2.50% level.

TABLE 4

Example Number 11
Emulsifier: Vinsol® NVX soap, (Sodium Soap of Vinsol® resin)

| Formulation[1] | 1.25 Wt. % Emulsifier | 1.50 Wt. % Emulsifier | 1.75 Wt. % Emulsifier | ASTM Specifications |
|---|---|---|---|---|
| Test Results | | | | |
| Residue, % | 60.0 | 59 | 59.4 | 57 min |
| Sieve, % | 0.001 | 0.001 | 0.001 | 0.1 max |
| Viscosity(SFS), 25°C. | 27.0 | 26.0 | 31.8 | 20–100 |
| Cement Mixing, % | 3.6 | 2.5 | 1.02 | 2.0 max |
| 1 Day Settlement, % | 2.86 | 1.47 | 0.71 | 1.0 max |
| 5 Day Settlement, % | na | na | 3.06 | na |
| Particle Charge | neg | neg | neg | |
| Penetration, 25° C., 100 g, 5 s, dmm | 43 | 42 | 40 | 40–90 |
| Ductility, 25° C., 5 cm/min, cm | 105+ | 105+ | 105+ | 40 min |
| Softening Point, °C. | 50 | 50 | 51 | na |

[1]Formulations further contain 61 wt. % asphalt and the remainder water.

TABLE 5

Example Number 12
Emulsifier: Product of Example 5

| Formulation[1] | 1.25 Wt. % Emulsifier | 1.50 Wt. % Emulsifier | 1.75 Wt. % Emulsifier | ASTM Specifications |
|---|---|---|---|---|
| Test Results | | | | |
| Residue, % | 60.5 | 61.0 | 59.0 | 57 min |
| Sieve, % | 0.009 | 0.001 | 0.001 | 0.1 max |
| Viscosity(SFS), 25° C. | 25.0 | 36.0 | 21.0 | 20–100 |
| Cement Mixing, % | 5.98 | 4.06 | 1.40 | 2.0 max |
| 1 Day Settlement, % | 4.03 | 0.60 | 0.85 | 1.0 max |
| 5 Day Settlement, % | na | 2.54 | 3.48 | na |
| Particle Charge | neg | neg | neg | |
| Penetration, 25° C., 100 g, 5 s, dmm | 45 | 45 | 40 | 40–90 |
| Ductility, 25° C., 5 cm/min, cm | 105+ | 105+ | 05+ | 40 min |
| Softening Point, °C. | 46.7 | 49.1 | 49.4 | na |

[1]Formulations further contain 61 wt. % asphalt and the remainder water.

TABLE 6

Example Number 113
Emulsifier: Product of Example 6

| Formulation[1] | 1.50 Wt. % Emulsifier | 2.00 Wt. % Emulsifier | 2.50 Wt. % Emulsifier | ASTM Specifications |
|---|---|---|---|---|
| Test Results | | | | |
| Residue, % | 59.0 | 59.8 | 59.5 | 57 min |
| Viscosity(SFS), 25° C. | 19 | 20 | 21 | 20–100 |
| Cement Mixing, % | 0.21 | 0.13 | 0.30 | 2.0 max |
| 1 Day Settlement, % | 5.40 | 1.16 | 0.24 | 1.0 max |
| 5 Day Settlement, % | na | na | 2.09 | na |

[1]Formulations further contain 61 wt. % asphalt and the remainder water.

While the invention has been described with respect to specific embodiments, it should be understood that they are not intended to be limiting and that many variations and modifications are possible without departing from the scope of this invention.

What is claimed:

1. Air-entrained concrete containing an air-entraining agent comprising alkali metal salt of lignin and alkali metal salt of polymerized rosin.

2. The air-entrained concrete of claim 1 wherein the air-entraining agent further comprises alkali metal salt of added rosin acids.

3. The air-entrained concrete of claim 1 wherein the alkali metal salt of lignin and the alkali metal salt of polymerized rosin are salts alkali metal selected from the group consisting of lithium, sodium, and potassium.

4. The air-entrained concrete of claim 2 wherein the alkali metal salt of lignin, the alkali metal salt of polymerized rosin and the alkali metal salt of added rosin acids are salts of alkali metal selected from the group consisting of lithium, sodium, and potassium.

5. The air-entrained concrete of claim 1 wherein the alkali metal salt of lignin and the alkali metal salt of polymerized rosin are salts of sodium.

6. The air-entrained concrete of claim 2 wherein the alkali metal salt of lignin, the alkali metal salt of polymerized rosin and the alkali metal salt of added rosin acids are salts of sodium.

7. The air-entrained concrete of claim 1 wherein the polymerized rosin comprises about 30 to 90 wt. percent rosin acid dimer.

8. The air-entrained concrete of claim 2 wherein the added rosin acids comprise rosin acids obtained by stripping off monomeric resin acids from a polymerized rosin by distillation.

9. The air-entrained concrete of claim 2 wherein the added rosin acids comprise from the 60% to about 70% dehydroabietic acid.

10. The air-entrained concrete of claim 1 wherein the lignin is organosolv lignin.

11. The air-entrained concrete of claim 1 wherein the ration of alkali metal salt of lignin to alkali metal salt of polymerized on a weight basis is from about 0.8 to about 2.3.

12. The air-entrained concrete of claim 9 wherein the ration of alkali metal salt of lignin to alkali metal salt of polymerized on a weight basis is from about 1 to about 2.

13. The air-entrained concrete of claim 10 wherein the ratio of alkali metal salt of lignin to alkali metal salt of polymerized on a weight basis is from about 1.5 to about 2.

14. The air-entrained concrete of claim 2 wherein the ratio of alkali metal salt of added rosin acids to the total of alkali metal salt of lignin and alkali metal salt of polymerized rosin on a weight basis is no greater than about 0.25.

15. The air-entrained concrete of claim 10 wherein the ratio of alkali metal salt of added rosin acids to the total of alkali metal salt of lignin and alkali metal salt of polymerized rosin on a weight basis is from about 0.05 to about 0.2.

16. The air-entrained concrete of claim 11 wherein the ratio of alkali metal salt of added rosin acids to the total of alkali metal salt of lignin and alkali metal salt of polymerized rosin on a weight basis is from about 0.05 to about 0.15.

17. The air-entrained concrete of claim 2 wherein the ratio of alkali metal salt of lignin to alkali metal salt of polymerized rosin on a weight basis is from about 1.5 to about 2, and the ration of alkali metal salt of added rosin acids to the total of alkali metal salt of lignin and alkali metal salt of polymerized rosin is from about 0.05 to about 0.15.

18. The air-entrained concrete of claim 3 wherein the lignin is organosolv lignin and the added rosin acids comprise rosin acids obtained by stripping off the monomeric rosin acids from a polymerized rosin by distillation.

* * * * *